METHOD OF REDUCING AVC TC IN AM MODULATED RADIOS
Filed Aug. 10, 1964
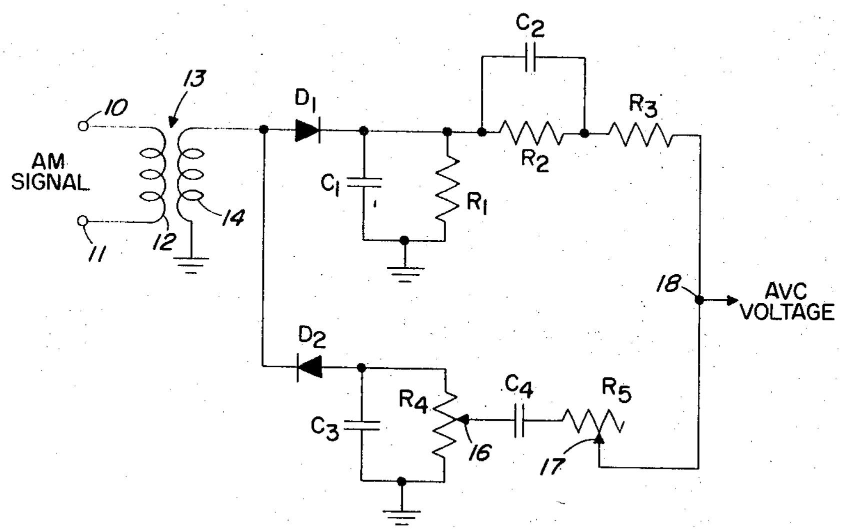
INVENTOR.
HOWARD B. ROOKS
BY [signature]
ATTORNEY 3,341,781

METHOD OF REDUCING AVC TC IN AM MODULATED RADIOS

Howard B. Rooks, Marion, Iowa, assignor to Collins Radio Company, Cedar Rapids, Iowa, a corporation of Iowa Filed Aug. 10, 1964, Ser. No. 388,452
5 Claims. (Cl. 325—414)

This invention relates in general to an automatic volume control circuit and in particular, to a novel and simple method of obtaining an automatic volume control signal.

It is desirable in radios to provide automatic volume control so as to prevent a radio receiver, for example, from blasting and fading.

It is the object of the present invention therefore to provide an automatic volume control wherein the positive and negative portions of the modulation envelope are detected and combined so as to produce an automatic volume control signal.

Another object of this invention is to provide an automatic volume control in which the positive and negative portions of the modulation envelope are detected and the audio signal is cancelled by adding the outputs of the detectors together to produce a direct current automatic volume control signal.

A feature of this invention is found in the provision for a pair of oppositely-poled detectors for detecting the positive and negative portions of the modulation envelopes and a combining circuit for eliminating A-C excursions while producing a direct current automatic volume control signal.

Further features, objects and advantages of this invention will become apparent from the following description and claims when read in view of the drawing in which:

The figure is a schematic diagram of the improved automatic volume control circuit of this invention.

The figure illustrates a pair of input terminals 10 and 11 which are connected to the primary 12 of an I-F transformer 13. A suitable AM modulated signal may be connected to the input terminals 10 and 11, for example. Secondary 14 of the transformer 13 has one end connected to ground and the other end connected to a pair of oppositely-poled diodes $D_1$ and $D_2$. Diode $D_1$, for example, is connected so as to pass positive signals and diode $D_2$ so as to pass negative signals. A condenser $C_1$ is connected between ground and the other side of diode $D_1$ and a resistor $R_1$ is connected across condenser $C_1$. A resistor $R_2$ is connected between resistor $R_1$ and a resistor $R_3$. A condenser $C_2$ is connected in shunt with resistor $R_2$. The second side of diode $D_2$ is connected to a condenser $C_3$ and a resistor $R_4$. The opposite sides of the condenser $C_3$ and resistor $R_4$ are connected to ground. A movable contact 16 engages resistor $R_4$ and is connected to a condenser $C_4$. A resistor $R_5$ is connected to condenser $C_4$. A second movable contact 17 is engageable with resistor $R_5$. The movable contact 17 is connected to the second side of resistor $R_3$. An output terminal 18 provides an automatic volume control voltage.

The resistor $R_5$ may be adjusted by movement of contact 17 to adjust the phase of the signals relative to each other in the A-C and D-C paths. Movable contact 16 may be used to adjust the amplitude of the signal in the A-C path.

In operation, the diode $D_1$ passes the positive portion of the modulation envelope and the diode $D_2$ passes the negative portion of the modulation envelope. Condenser $C_4$ provides a block for D-C signals in the negative portion of the circuit. The positive D-C signal passes through the resistor $R_2$.

The signals are combined at point 18 and the A-C excursions are cancelled because they are exactly opposite and only the D-C automatic volume control signal remains at point 18. The phase adjustment to correct for any phase differential is accomplished by moving contact 17 relative to resistor $R_5$ and any necessary amplitude adjustment may be made by contact 16 relative to resistor $R_4$.

Condensers and resistors $C_1$, $R_1$ and $C_3$, $R_4$ are useful for filtering undesired frequency components which may occur in the circuit.

In a particular circuit constructed according to this invention, the I-F transformer 13 was tuned to 500 kc. and the following component values are used:

| | | |
|---|---|---|
| $D_1$–$D_2$ (diodes) | | Type IN270 |
| $C_1$–$C_3$ | micromicrofarads | 4700 |
| $R_1$ | ohms | 2.7K |
| $R_2$ | do | 100K |
| $R_3$ | do | 4.7K |
| $R_4$ | do | 3K |
| $R_5$ | do | 10K |
| $C_2$ and $C_4$ | microfarad | 1 |

It is seen that this invention detects the positive and negative portions of the modulation envelope and combines the output to cancel the modulation frequencies to produce an automatic volume control voltage.

Although it has been described with respect to a particular embodiment thereof, it is not to be so limited, as changes and modifications may be made therein which are within the spirit and scope of the invention as defined by the appended claims.

I claim:

1. An automatic volume control circuit comprising a pair of detectors connected together such that one detector will pass a positive signal and the other detector will pass a negative signal, means for blocking a D-C signal in the output of one of the detectors and the output of the other detector connected to the output of the blocking means to produce an automatic volume control voltage.

2. An automatic volume control circuit comprising a pair of detectors connected together so that they are oppositely poled, an AM modulation envelope connected to the input of said detectors, a D-C blocking means with its input connected to the output of one of said detectors, and the output of the other detector connected to the output of the D-C blocking means to produce an automatic volume control voltage.

3. An automatic volume control circuit comprising a pair of oppositely-poled detectors connected together and receiving an AM modulation envelope thereon, first and second filter means connected between the output of said detectors and ground, a direct current blocking means connected between the first and second filtering means, and an output terminal connected between the direct current blocking means and one of the filters.

4. An automatic volume control circuit comprising a pair of oppositely-poled detectors with their inputs connected together and receiving an input signal thereon, an output terminal, impedance means connected between said output terminal and the output of one of said pair of detectors, and a direct current blocking means connected between the output of the other of said pair of detectors and the output terminal.

5. An automatic volume control circuit comprising a pair of oppositely-poled detectors with their inputs connected together and receiving an amplitude modulated signal thereon, an output terminal, an impedance means connected between the output terminal and the output of one of said pair of detectors, a direct current blocking means connected between the output terminal and the output of the other of said pair of detectors, and said impedance means comprising a resistor and capacitor in parallel to provide a direct current path.

No references cited.

KATHLEEN H. CLAFFY, *Primary Examiner.*

R. LINN, *Assistant Examiner.*